Patented Mar. 2, 1954

2,671,023

UNITED STATES PATENT OFFICE 2,671,023

PREPARATION OF AZO DYE IMAGES IN PHOTOGRAPHIC MATERIALS

Donald E. Sargent, Easton, Pa., assignor to General Aniline & Film Corporation, New York, N. Y., a corporation of Delaware No Drawing. Application December 16, 1949, Serial No. 133,481

8 Claims. (Cl. 95—88)

1

The present invention relates to color photography and more particularly to the preparation of azo dye images in photographic materials.

Many methods have been proposed for the imagewise formation of azo dyes in photographic emulsions. Probably the most important of such methods so far developed is that called the silver-dye bleaching method. This method involves the pre-dyeing of multilayer film with the three subtractive colors, to wit, yellow, magenta and cyan, the exposure and development of the colored material, and the destruction of the dyes in situ with the silver image.

This method has the advantage that it yields dye images much more resistant to light and chemicals than the azo-methine and quinonimine dye images produced by the well known color development method. On the other hand, it has the disadvantage that the colored emulsion layers act as filters, thereby decreasing the sensitivity of such layers to such an extent that the colored material can only be used in printing.

Another method for the formation of azo dye images in silver halide emulsions is described in USP 2,308,023 to Willard D. Peterson, entitled "Colored Photographic Image," dated January 12, 1943. According to this method, a silver halide emulsion is exposed, developed to black and white and bleached to remove silver. The emulsion is then treated with a pre-formed azo dyestuff having in its molecule a heterocyclic ring system containing either a mercapto or imino group capable of reacting with silver halides to form therewith salts which are less soluble than the silver halides.

The disadvantages in this procedure are manifest. In the first place the dyes employed are of a type which are difficultly soluble in the usual photographic alkalies and acids, such as sodium carbonate, sodium hydroxide, acetic acid, dilute mineral acids, and the like. As a consequence it is extremely difficult to impregnate gelatin layers with these dyestuffs.

Furthermore, when solutions of these dyes are used to impregnate a gelatin emulsion, the gelatin thereof exerts a buffering action, causing the dye to precipitate throughout the emulsion. Such precipitation inevitably causes staining of the emulsion in the white areas of the photographic element. In addition, many of these dyes have a natural affinity for gelatin and even when the gelatin does not effect a buffering action thereon, the dyes are so tenaciously retained by the gelatin that it is impossible to remove the dyes completely from the white areas by washing.

If the procedure of this patent were to be im-

2 proved to overcome to some extent the disadvantages noted by including in the dyes water-solubilizing groups, the dyes as a result of such groups become so soluble in the common silver salt solvents used in processing that they are removed from the emulsion to a considerable extent.

The accuracy of this statement may be readily appreciated by a consideration of, for example, USP 2,266,441 of Willard D. Peterson, entitled "Photographic Filter and Colored Image," dated December 16, 1941. In this patent, filter layers containing dyestuffs which are removable by the usual fixing baths such as hypo and cyanide are prepared by diffusely dyeing a colloidal layer with an azo dyestuff containing a heterocyclic ring system of the type previously mentioned, the dyestuff, however, possessing a water solubilizing group such as sulfo, carboxy, or the like. These dyestuffs, due to the presence of such groups, are found to be soluble in the fixing solutions and removable from the colloidal layer during processing of the photographic element.

I have now devised a method for the imagewise preparation of azo dyes which overcomes the disadvantages inherent in the above methods.

According to my procedure, a photographic element bearing a silver halide image is bathed in an alkali solution of an alkali soluble colorless compound containing a radical permitting the compound to react with the silver halide to form a less soluble silver salt and also containing a group permitting said compound to couple with a diazonium compound to form an azo dye. The element is then washed thoroughly with water to remove all of said compound from the white areas thereof. By now treating the resulting new silver salt with a diazonium compound free from water solubilizing groups other than the diazonium group, said silver salt couples to form an azo dye image in situ with the original silver halide image. Such image is not only water insoluble but is equally insoluble in the usual silver salt solvents so that it is unaffected in the subsequent processing of the element. By now further washing the element to remove unreacted diazonium compound, the white areas are freed from any stain, dyestuff or dye forming agents.

It is self evident that the photographic element contemplated herein may be used as taking film since it does not originally contain light absorbing dyestuffs or materials which alter the sensitivity of the emulsion. On the other hand, since the couplers and diazonium compounds are far more soluble than azo dyes produced therefrom, no difficulty is experienced in impregnating photographic emulsions therewith. Such solubility also permits complete removal of these agents from the emulsions by a simple washing in water so that there is absolutely no problem of stain formation inevitably encountered in the use of the pre-formed azo dyes.

The preparation of azo dye images by this procedure constitutes the purposes and objects of this invention.

The coupler compounds designed for reaction with silver halide images to form more insoluble silver salts contain a coupling group, such as a phenolic hydroxyl or a reactive methylene group, and in addition a —CSNH— group as part of a heterocyclic ring or in an open chain structure. Through the agency of the latter group, the coupler compound reacts with the silver halide to form a silver salt less soluble than the silver halide.

Examples of such compounds are:

1. 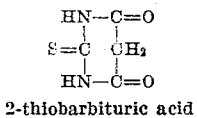
2-thiobarbituric acid

2. 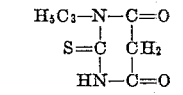
1-allyl-2-thiobarbituric acid

3. 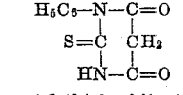
1-phenyl-2-thiobarbituric acid

4. 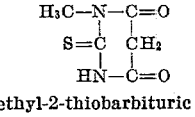
1-methyl-2-thiobarbituric acid

5. 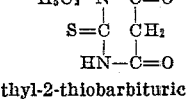
1-ethyl-2-thiobarbituric acid

6. 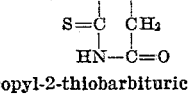
1-propyl-2-thiobarbituric acid

7. 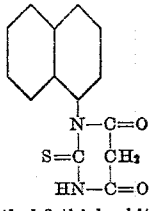
1-α-naphthyl-2-thiobarbituric acid

8. 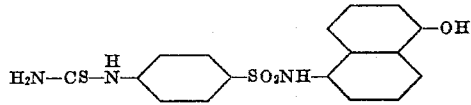
N-(1-hydroxy-5-naphthyl)-p-thioureido-benzenesulfonamide

9. 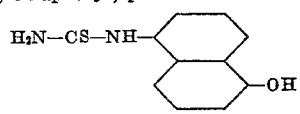
5-hydroxy-α-naphthylthiourea

10. 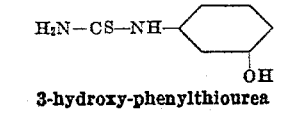
3-hydroxy-phenylthiourea

11. 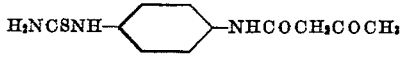
4-acetacetylamino-phenylthiourea

12. 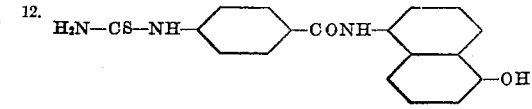
N-(1-hydroxy-5-naphthyl)-p-thioureido-benzamide

Any diazonium salt free from water solubilizing groups other than the diazonium groups may be utilized for the preparation of the dye images, the salt of course being selected in conjunction with the coupler to yield the desired color. Examples of amines from which the diazonium compounds may be prepared are the following:

4-nitro-2-methoxyaniline
2,5-dichloroaniline
4-benzoylamino-2,5-diethoxyaniline
2-amino-4,4'-dichlorodiphenyl oxide
2-amino-4-chlorodiphenyl oxide
5-methyl-2-methoxyaniline
3-chloroaniline
2-chloroaniline
2-methyl-4-nitroaniline
3-benzoylamino-4,6-dimethylaniline
3-chloro-4-nitro-6-methoxyaniline
4,4'-diamino-3,3'-dimethyldiphenyl
3-aminocarbazole
4-aminoazobenzene
4-chloro-2-methylaniline
1-naphthylamine
4-chloro-2-nitroaniline
4,4'-diaminodiphenylamine
1-amino-anthraquinone
N-(p-aminobenzoyl)-p-toluidine
Benzidine
4,4'-diamino-3,3'-dimethoxydiphenyl These diazonium compounds are preferably used in the form of stabilized salts, such as the double salt with zinc chloride, tin chloride, cadmium chloride, as a fluoborate, or the like. The double salts have the advantage that they eliminate the necessity of diazotizing the base immediately prior to use. In addition the diazonium compounds are more stable in the processing solutions when used in the form of their double salts.

The mechanism by which azo dye images are produced in this process may be represented by the following equation, assuming, for the sake of simplicity, the utilization of the zinc chloride double salt of the diazonium chloride of aniline as the diazonium compound:

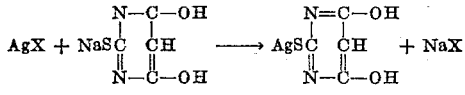

Silver halide image / Sodium-2-thiobarbiturate written in the enolic form / Insoluble coupler image (silver 2-thiobarbiturate)

Zinc chloride double salt of diazonium compound →

Silver salt of azo dye comprising insoluble image

It is to be understood that this mechanism is being advanced for the purpose of better explaining the process rather than as an exact scheme as to how the reaction proceeds.

The invention is further illustrated by the following examples, but it is to be understood that the invention is not restricted thereto.

Example I

A strip of positive film carrying a silver halide image of variable density is bathed with agitation in a 0.5% solution of 2-thiobarbituric acid in 7% aqueous sodium carbonate for 30 seconds at 18° C. The film is then washed in running water at 18° C. for 3 minutes to remove unreacted 2-thiobarbituric acid from the "white" areas. The film is then bathed with agitation in an aqueous 1% solution of the zinc chloride double salt of the diazonium chloride prepared from 2-amino-4-chlorodiphenyloxide for 1 minute and then washed for 5 minutes in running water at 18° C. to remove excess diazonium compound. After treatment in an acid hypo fixing bath until clear of unconverted silver halide, the film carries a yellow dye image corresponding in intensity to the original silver halide image. The "white" areas are perfectly clear.

Example II

The procedure is the same as in Example I excepting that the 2-thiobarbituric acid solution is replaced by a 0.5% solution of 5-hydroxy-α-naphthylthiourea in 3% sodium hydroxide solution. There is obtained an orange dye image corresponding in intensity to the silver halide image and insoluble in water and hypo.

Example III

The procedure is the same as in Example I excepting that the thiobarbituric acid is replaced by a solution of 0.5% of 3-hydroxyphenylthiourea in 3% sodium hydroxide. The image produced is greenish yellow in color and is insoluble in water and hypo.

Example IV

The procedure is the same as in Example I excepting that the solution of the zinc chloride double salt is replaced by an aqueous 1% solution of the zinc chloride double salt of the diazonium chloride prepared from 1-aminoanthraquinone. The dye image obtained is golden yellow of excellent light fastness.

Example V

The procedure is the same as in Example I excepting that the zinc chloride double salt solution is replaced by an aqueous 1% solution of the zinc chloride double salt of the diazonium chloride prepared from 4-benzoylamino-2,5-diethoxyaniline. The dye image obtained is magenta in color and of good light fastness.

Example VI

The procedure is the same as in Example I excepting that the solution of the zinc chloride double salt is replaced by an aqueous 1% solution of the zinc chloride double salt prepared from the diazonium chloride of 4,4'-diamino-3,3'-dimethoxydiphenyl. A magenta image insoluble in water and hypo is thus obtained.

Example VII

The procedure is the same as in Example I excepting that the 2-thiobarbituric acid solution is replaced by a solution of 0.5% of 5-hydroxy-α-naphthylthiourea in 3% sodium hydroxide and the solution of the zinc chloride double salt is replaced by an aqueous 1% solution of the zinc chloride double salt of the diazonium chloride prepared from 4,4'-diamino-3,3'-dimethoxydiphenyl. A blue image of excellent light fastness is thus obtained.

Various modifications of the invention will occur to persons skilled in this art, and I therefore do not intend to be limited in the patent granted except as necessitated by the appended claims.

I claim:
1. The process of producing azo dye images in a photographic element bearing a silver halide emulsion which comprises forming a silver halide image therein, treating the silver halide image with a solution of an azo dye coupling component containing a coupling group selected from the class consisting of phenolic, hydroxyl and reactive methylene, and in addition a —CSNH— grouping capable of reacting with the silver halide to produce a less soluble silver salt, washing the element to remove unreacted coupling component from the "white" areas, treating the silver salt thus formed with an aqueous solution of a diazonium compound free from water solubilizing groups other than the diazonium group to form an azo dyestuff image, and washing the element to remove excess diazonium compound.

2. The process as defined in claim 1 wherein the diazonium compound is employed in the form of a double salt.

3. The process as defined in claim 1 wherein the —CSNH— group is present in a heterocyclic ring.

4. The process as defined in claim 1 wherein the —CSNH— group is present in an open chain structure.

5. The process as defined in claim 1 wherein the azo dye coupling component is 2-thiobarbituric acid.

6. The process as defined in claim 1 wherein the azo dye coupling component is 5-hydroxy-α-naphthylthiourea.

7. The process as defined in claim 1 wherein the azo dye coupler is 2-thiobarbituric acid and the diazonium compound is the zinc chloride double salt of the diazonium chloride prepared from 2-amino-4-chlorodiphenyloxide.

8. The process as defined in claim 1 wherein the azo dye coupling component is 2-thiobarbituric acid and the diazonium compound is the zinc chloride double salt of the diazonium chloride prepared from 1-amino-anthraquinone.

DONALD E. SARGENT.

References Cited in the file of this patent

UNITED STATES PATENTS

| Number | Name | Date |
|---|---|---|
| 1,963,197 | Froehlich | June 19, 1934 |
| 1,968,956 | Murray | Aug. 7, 1934 |
| 2,177,257 | Jakob et al. | Oct. 24, 1939 |
| 2,266,441 | Peterson | Dec. 16, 1941 |
| 2,279,411 | Peterson | Apr. 14, 1942 |
| 2,296,306 | Peterson | Sept. 22, 1942 |
| 2,306,410 | Schinzel | Dec. 29, 1942 |
| 2,308,023 | Peterson | Jan. 12, 1943 |
| 2,376,822 | Schneider | May 22, 1945 |

FOREIGN PATENTS

| Number | Country | Date |
|---|---|---|
| 524,556 | Great Britain | Aug. 8, 1940 |